United States Patent
Rangarajan et al.

(10) Patent No.: US 9,305,459 B2
(45) Date of Patent: Apr. 5, 2016

(54) AUTOMATED DRIVER ALERT SYSTEM

(75) Inventors: Anand P. Rangarajan, Hillsboro, OR (US); Victor B. Lortz, Beaverton, OR (US); Somya Rathi, Portland, OR (US); Vijay Sarathi Kesavan, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 190 days.

(21) Appl. No.: 13/992,724

(22) PCT Filed: Nov. 30, 2011

(86) PCT No.: PCT/US2011/062735
§ 371 (c)(1),
(2), (4) Date: Jun. 8, 2013

(87) PCT Pub. No.: WO2013/081613
PCT Pub. Date: Jun. 6, 2013

(65) Prior Publication Data
US 2013/0257631 A1    Oct. 3, 2013

(51) Int. Cl.
| G08G 1/00 | (2006.01) |
| G08G 1/0962 | (2006.01) |
| B60R 16/023 | (2006.01) |
| G08G 1/015 | (2006.01) |
| G08G 1/017 | (2006.01) |
| G08B 27/00 | (2006.01) |

(52) U.S. Cl.
CPC ............ *G08G 1/0962* (2013.01); *B60R 16/023* (2013.01); *G08B 27/008* (2013.01); *G08G 1/015* (2013.01); *G08G 1/0175* (2013.01); *G08G 1/205* (2013.01)

(58) Field of Classification Search
None
See application file for complete search history.

(56) References Cited

U.S. PATENT DOCUMENTS

| 6,433,706 B1 | 8/2002 | Anderson | |
| 6,982,654 B2 * | 1/2006 | Rau et al. | 340/937 |
| 7,711,150 B2 * | 5/2010 | Simon | 382/105 |
| 2009/0322560 A1 * | 12/2009 | Tengler et al. | 340/905 |
| 2011/0102194 A1 * | 5/2011 | Kinoshita | 340/905 |

OTHER PUBLICATIONS

PCT International Search Report and Written Opinion issued in corresponding PCT/US2011/062735 dated Jul. 27, 2012 (11 pages).

* cited by examiner

*Primary Examiner* — Travis Hunnings
(74) *Attorney, Agent, or Firm* — Trop Pruner & Hu, P.C.

(57) ABSTRACT

In accordance with some embodiments, an automated system may be implemented in which alerts to drivers are automatically distributed and implemented at the driver's vehicle. Thus, in some embodiments, no involvement by the driver is needed and everything may be done in an automated fashion including filtering alerts and responding to alerts. In some embodiments, each vehicle need not provide its current location to the Amber Alert System, providing greater privacy in some cases.

26 Claims, 2 Drawing Sheets

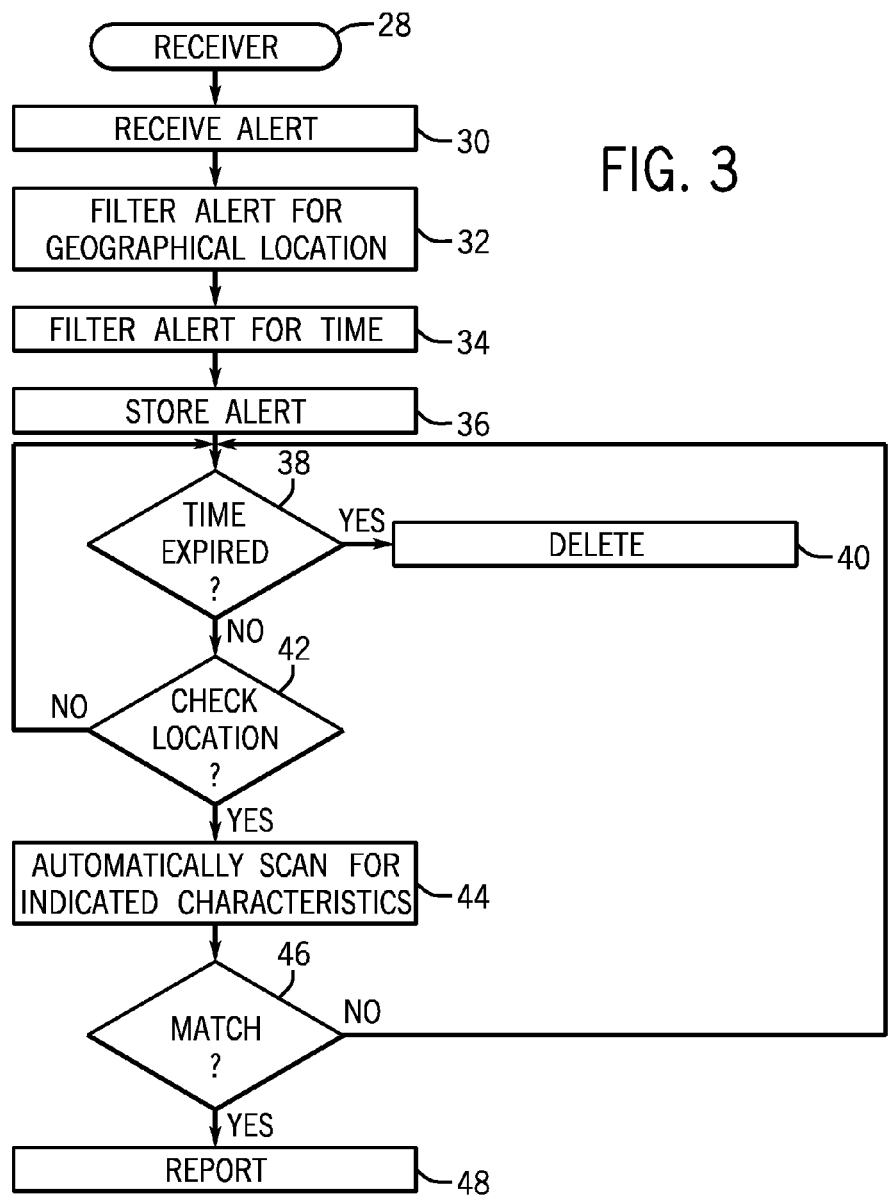
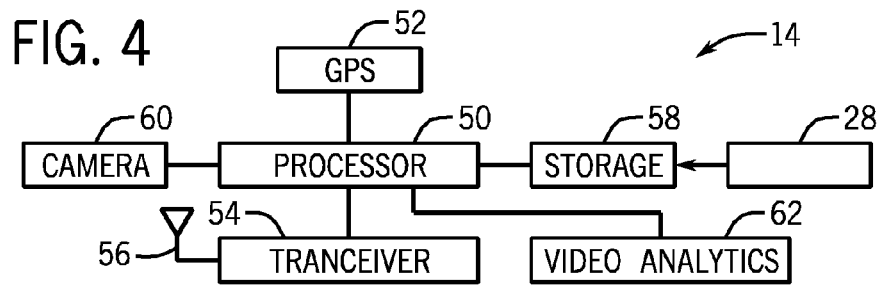

AUTOMATED DRIVER ALERT SYSTEM

BACKGROUND

This relates generally to driver alert systems such as an Amber alert system widely available in the United States.

An Amber alert is distributed in a geographic area. An alert may then be displayed on electronic signs along roadways. Commonly alerts are provided for missing persons, abducted children and to locate persons accused of crimes. As used herein a "driver alert" is any message distributed to obtain the public's assistance in locating a target vehicle.

In order to be useful, people must read the signs, remember the information, and when they see a suspect vehicle, recall the information, and apply the information by calling an appropriate phone number. There are many opportunities for failure in this system and therefore it is possible that in many cases, an Amber alert is ineffective.

BRIEF DESCRIPTION OF THE DRAWINGS

FIG. 3 is a flowchart of another embodiment of the present invention; and

FIG. 4 is a schematic depiction of the system for one embodiment to the present invention.

DETAILED DESCRIPTION

In accordance with some embodiments, an automated system may be implemented in which driver alerts are automatically implemented at receiving vehicles. Thus, in some embodiments, no involvement by the driver is needed and everything may be done in an automated fashion including filtering alerts and responding to alerts. In some embodiments, each vehicle need not provide its current location to the Amber alert system, affording greater privacy in some cases.

Figure 1:
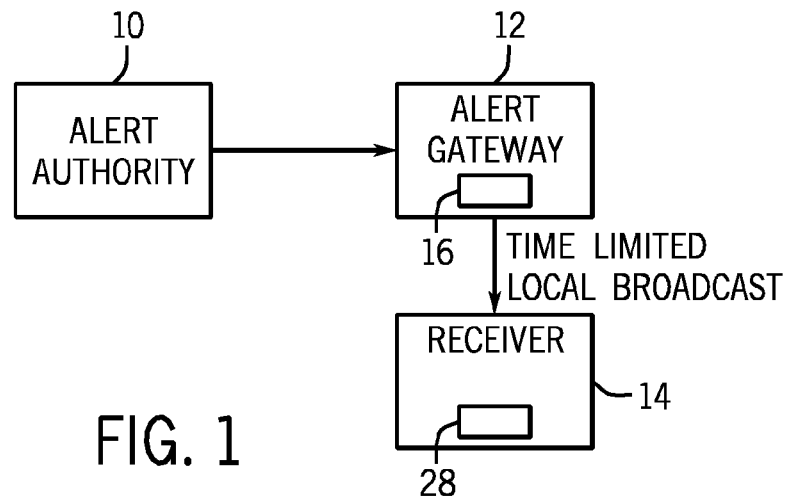
FIG. 1 is a schematic depiction of one embodiment of the present invention.

Referring to FIG. 1, the system includes an Amber alert authority 10 that broadcasts Amber alerts. These driver alerts may be distributed through electronic signage along highways and may also be obtained by local alert gateways 12. The local alert gateway 12 may then re-transmit the alert in a form suitable for automated implementation within a geographic area. In some embodiments, a relatively refined or limited geographic area may receive the alert and use other embodiments, a more unrefined or unlimited geographic area is used with reliance upon the receiver 14 to further cull out alerts that are not geographically pertinent given the receiver's current location.

The alert gateway 12 may distribute the alert using any available range limited distribution system in some embodiments. For example, a web-based method such as RDF Site Summary (RSS) or Extensible Messaging and Presence Protocol (XMPP) may be used to distribute a document or feed. See RSS 2.0 specification available from the RSS Advisory Board and XMPP RFC 6120 available for XMPP Standards Foundation. A message may be broadcast on a local wireless network such as a dedicated short range communication system (DSRC) or the message may be sent in the form of geographically limited cellular network broadcasts containing data such as short message service (SMS), including basic information plus a link to the data alert record.

In some embodiments, once received, the driver alert is converted into a form, recognizable by the receiver, that is capable of being automatically implemented. Thus, an alert may provide geographical information about the scope of the alert and the time duration of the alert so that these criteria may be enforced locally at the receiver 14. In addition, the alert may be coded in a way that it can be interpreted and implemented by the receiver, and particularly, so that the receiver can determine how to implement the alert without bothering the driver. Thus, the alert may automatically activate a vehicle camera system to monitor for a given license plate number. If the license number is identified, a response may be sent automatically to an address specified in the alert. The various activities to be undertaken by the receiver and information needed by receiver may be provided in preformatted fields of the alert transmission that are understood and used by the receiver to automatically implement Amber alerts in some embodiments.

In some embodiments, the driver alert may be signed so that the receiver 14 can authenticate the alert to prevent misuse of the system. For example, the receiver 14 may have stored information about the signatures that should be appended to the alert and only when an appropriate signature is received and recognized is the alert automatically implemented.

As one example, the alert may include a frame format with predefined fields. One field may provide an expiration time, another field may provide a geographic scope, and another field may specify the features to search for. Still another field may specify search criteria such as levels of assurance to qualify as a search hit. Finally still another field may specify what action to take in the event of a search hit within the specified assurance level.

Figure 2:
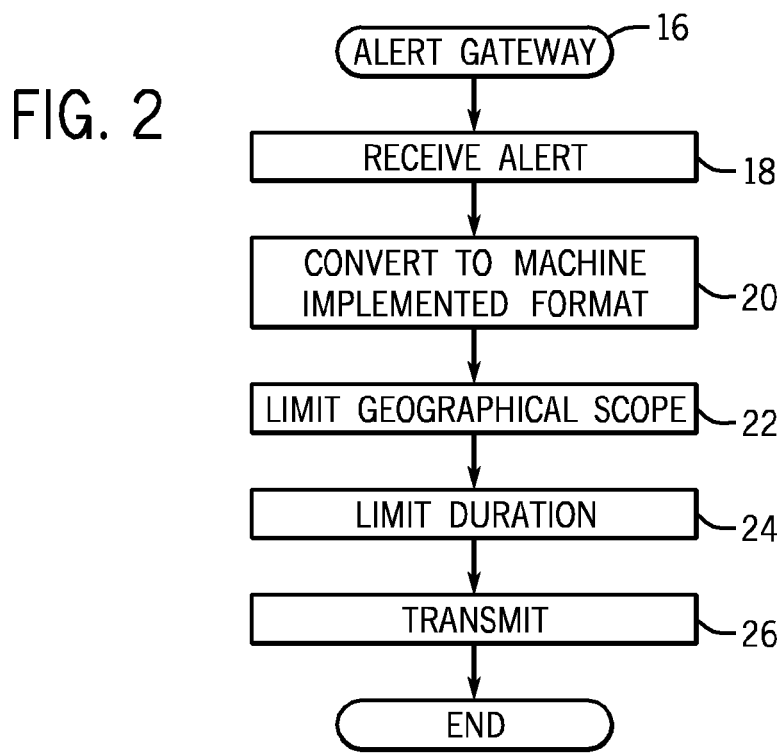
FIG. 2 is a flowchart for one embodiment of the present invention.

A sequence 16 for implementing an alert gateway 12 is illustrated in FIG. 2. The sequence may be implemented in software, firmware and/or hardware. In software and firmware embodiments may be implemented by computer executed instructions stored in a non-transitory computer readable medium such as an optical, magnetic or semiconductor storage.

The sequence 16 begins at gateway 11 when an alert is received (block 18) from an alert authority 10. The alert may come in over a wired or wireless connection. Once the alert is authenticated, the alert may be converted into a machine-implementable format as indicated in block 20. Certain information may be provided in pre-ordained fields and in pre-ordained formats to facilitate automatic implementation in the receiver 14.

A geographical scope limitation may be appended to the alert as indicated in block 22. Likewise a time duration for the alert may be provided as indicated in block 24. Thereafter, the alert information and implementation instructions may be transmitted as indicated in block 26. In some embodiments the transmission may be in a geographically limited fashion so that only those receivers that are present in an area of interest will receive the alert. In other embodiments, a geographic limitation may be provided that may be checked by the receiver and only when the receiver is in that geographic locality is the alert executed.

Thus, in some embodiments, the receiver 14 may not reveal its current position to the alert gateway or the alert authority. These embodiments may have privacy advantages.

Referring to FIG. 3 a sequence 28 may be implemented in the receiver 28 in software, firmware and/or hardware. In software and firmware embodiments the sequence may be implemented by computer executable instructions stored in a non-transitory computer readable medium such as an optical, magnetic, or semiconductor storage.

The sequence begins at the receiver 14 when an alert is received at block 30. The alert may be checked to be sure that it is authentic by determining whether it includes an appropriate digital signature or other security confirmation information. If the alert is authentic, the alert may be filtered for a pertinent geographic location by parsing information from the alert that defines a geographic area of interest (block 32).

In addition, the alert may be filtered for an expiration time (block 34). Again this may be done by checking the alert for its expiration time and parsing that information for application in the receiver 14. In some cases, a default duration may be inferred by the receiver if no other information is included in the alert.

The alert may be stored within a receiver 14 as indicated in block 36. Then a check at diamond 38 determines whether the time limitation for the alert has expired. If so, it is deleted (block 40). If not, the current location of the receiver 14 is checked (diamond 42). The location information may be obtained from a global positioning system sensor in one embodiment. If the current location is within the alert's geographical scope, as determined in diamond 42, an onboard camera system may automatically scan for characteristics identified in the alert, as indicated in block 44. For example, the indicated characteristics may be a model of vehicle, a shape of vehicle, or a license plate number. Pattern recognition systems and video analytics may be used onboard to determine whether or not any of the camera captured characteristics match the alert identified characteristics.

If there is a match, as determined in block 46, a report may be provided as indicated in block 48. A format of the report may be specified in the alert or may be preordained by default. In addition, the report may be addressed to an address and in a way specified in the alert.

If there is no match, then the flow iterates back to check whether the alert active time has expired.

If an alert is an Amber alert and if the car has suitable cameras and in-vehicle processing capabilities, a car may scan surrounding cars for license plates, vehicle shape, and color to match values contained in the Amber alert. If a possible match is detected, the car's Amber alert monitor submits a report to authorities by uploading a data record to the alert gateway in one embodiment. A data record may include evidence such as a digital image from the camera that matches the alert, or it may just contain a signed assertion of a match with a car type, location, time stamp, or estimated assurance level. The car type and assurance level metric can be used to help authorities prioritize any follow-up on leads obtained from different Amber alert monitors. For privacy reasons, the car's Amber alert monitor may enforce an owner's specified policy for whether alerts are automatically reported or only reported when the driver confirms a report request.

In some embodiments, alert distribution and processing may be limited to prevent misuse of a system. Each alert may be digitally signed and vehicles are able to detect or ignore any malicious alert messages sent by an attacker. However, there is still need to limit the temporal and geographic scope of alerts to help the car system filter out relevant data. For example, the signed data in the alert may contain an estimated geographic scope for the particular alert. The scope may be represented as a shape such as a distance from a centerpoint or it may be a list of line segments on specific roads with global positioning system (GPS) coordinates of endpoints. Given this information, a car navigation system can overlay a normal map display with the alert annotations. Each alert may then include an expiration time so that obsolete data can be ignored.

In some embodiments, the receiver 14 may be an in-vehicle personal computer or mobile computer such as a laptop computer, cellular telephone, or a mobile internet device. In the case of an in-car personal computer, the device may be an in-vehicle infotainment system in one embodiment.

The receiver 14, shown in FIG. 4, may include a processor linked to a global positioning system sensor 52 and a transceiver 54. The transceiver 54 may include an antenna 56 for wireless transmissions such as cellular or Wi-Fi transmissions to mention two examples. A storage 58 coupled to the processor 50 may include the rules for how to parse and handle alerts that are received from the alert gateway and may store information about ongoing searches.

A video camera 60 may be coupled to the processor so that the processor can automatically turn on the camera. The processor 50 may be coupled to a video analytics engine 62 that may analyze the captured video for alert defined search criteria such as license plate numbers.

References throughout this specification to "one embodiment" or "an embodiment" mean that a particular feature, structure, or characteristic described in connection with the embodiment is included in at least one implementation encompassed within the present invention. Thus, appearances of the phrase "one embodiment" or "in an embodiment" are not necessarily referring to the same embodiment. Furthermore, the particular features, structures, or characteristics may be instituted in other suitable forms other than the particular embodiment illustrated and all such forms may be encompassed within the claims of the present application.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
sending a driver alert to a receiving vehicle together with implementation information, said implementation information to enable a search, for a target vehicle, to be implemented automatically by the receiving vehicle using the implementation information, such that receipt of the implementation information is all that the vehicle needs to perform an automated search for the vehicle using the implementation information.

2. The method of claim 1 including sending the alert to a receiving vehicle without the receiving vehicle identifying itself.

3. The method of claim 1 including sending the alert with a time duration.

4. The method of claim 1 including sending the alert with a geographic limitation.

5. The method of claim 1 including sending the alert with machine implementable instructions for conducting a search for the target vehicle.

6. A non-transitory computer readable medium storing instructions executed by a computer to:
send a driver alert to a receiving vehicle together with implementation information, said implementation information to enable a search, for a target vehicle, to be implemented automatically by the receiving vehicle using the implementation information, such that receipt of the implementation information is all that the vehicle needs to perform an automated search for the vehicle using the implementation information.

7. The medium of claim 6 further storing instructions to send the alert to a receiving vehicle without the sending vehicle identifying itself.

8. The medium of claim 6 further storing instructions to send the alert with a time duration.

9. The medium of claim 6 further storing instructions to send the alert with a geographic limitation.

10. The medium of claim 6 further storing instructions to send the alert with machine implementable instructions for conducting a search for the target vehicle.

11. A apparatus comprising:
 a processor to send a driver alert to a receiving vehicle together with implementation information, said implementation information to enable a search, for a target vehicle, to be implemented automatically by the receiving vehicle using the implementation information, such that receipt of the implementation information is all that the vehicle needs to perform an automated search for the vehicle using the implementation information; and
 a storage coupled to said processor.

12. The apparatus of claim 11 said processor to enable a receiving vehicle to receive the alert without the receiving vehicle identifying itself.

13. The apparatus of claim 11 said processor to send the alert with a time duration.

14. The apparatus of claim 11 said processor to send the alert with a geographic limitation.

15. The apparatus of claim 11 said processor to send the alert with machine implementable instructions for conducting a search for the target vehicle.

16. An apparatus comprising:
 a processor to receive a driver alert together with implementation information to enable an automated search for a target vehicle, said processor to automatically implement the search using the implementation information; and
 a storage coupled to said processor.

17. The apparatus of claim 16 including a camera to automatically analyze information about a target vehicle and to identify the target vehicle.

18. The apparatus of claim 16, said apparatus to receive the alert without identifying itself.

19. The apparatus of claim 16, said apparatus to enforce a time duration contained in the alert.

20. The apparatus of claim 16, said apparatus to enforce a geographical limitation in the alert.

21. The apparatus of claim 16, said apparatus including a camera to automatically conduct a visual search for the target vehicle.

22. The apparatus of claim 16, said apparatus to parse information from the alert and to use the information to determine what to look for and how to report the results of a search.

23. The apparatus of claim 16, said apparatus to use video analytics to analyze video taken by the apparatus and to determine if a target vehicle has been located.

24. The apparatus of claim 16, said apparatus mounted on a vehicle.

25. The apparatus of claim 24, wherein said apparatus is an in-vehicle infotainment system.

26. The apparatus of claim 24, wherein said apparatus is a cellular telephone.

* * * * *